United States Patent
Kosaka et al.

(10) Patent No.: US 12,478,310 B2
(45) Date of Patent: Nov. 25, 2025

(54) METHOD AND SYSTEM FOR SIGNAL PROCESSING REHABILITATION EXERCISE SIGNALS

(71) Applicant: NEC Corporation, Tokyo (JP)

(72) Inventors: Yuki Kosaka, Bendemeer Road (SG); Yusuke Takahashi, Bendemeer Road (SG); Charles Choy, Bendemeer Road (SG)

(73) Assignee: NEC CORPORATION, Tokyo (JP)

( * ) Notice: Subject to any disclaimer, the term of this patent is extended or adjusted under 35 U.S.C. 154(b) by 1528 days.

(21) Appl. No.: 16/963,385

(22) PCT Filed: Jan. 16, 2019

(86) PCT No.: PCT/JP2019/001160
§ 371 (c)(1),
(2) Date: Jul. 20, 2020

(87) PCT Pub. No.: WO2019/150962
PCT Pub. Date: Aug. 8, 2019

(65) Prior Publication Data
US 2021/0362005 A1    Nov. 25, 2021

(30) Foreign Application Priority Data
Feb. 2, 2018 (SG) .......................... 10201800954Q

(51) Int. Cl.
*A61B 5/389* (2021.01)
*A63B 24/00* (2006.01)
*G06F 18/22* (2023.01)

(52) U.S. Cl.
CPC .......... *A61B 5/389* (2021.01); *A63B 24/0062* (2013.01); *G06F 18/22* (2023.01); *A63B 2220/62* (2013.01); *A63B 2220/803* (2013.01); *A63B 2230/08* (2013.01); *A63B 2230/60* (2013.01)

(58) Field of Classification Search
None
See application file for complete search history.

(56) References Cited

U.S. PATENT DOCUMENTS

2018/0000426 A1   1/2018   Li

FOREIGN PATENT DOCUMENTS

| JP | 2008-134706 A | 6/2008 |
|---|---|---|
| JP | 2017-140198 A | 8/2017 |
| WO | 2017/179090 A1 | 10/2017 |

OTHER PUBLICATIONS

Steele et al. Bodies in motion: Monitoring daily activity and exercise with motion sensors in people with chronic pulmonary disease Journal of Rehabilitation Research and Development vol. 40, No. 5, Sep./Oct. 2003, Supplement 2 pp. 45-58.*

* cited by examiner

*Primary Examiner* — Joseph Woitach

(57) ABSTRACT

The present disclosure relates to method and system for signal processing rehabilitation exercise signals. The method comprises the step of receiving a first and a second motion signals associated with movements of a body part, wherein the motion signals comprise temporal data of the movements. The method further comprises the step of segmenting each of the first and second motion signals into a plurality of segmented signals based on gradients of the motion signals, wherein each segmented signal has consistent gradient. The method further comprises the step of automatically modifying the segmented signals to form multiple combinations of matching signals with similar gradients between the first and second motion signals, such that the first and second motion signals are in one-to-one correspondence. The method further comprises the step of extracting corresponding time intervals of the matching signals in the correspondences.

11 Claims, 13 Drawing Sheets

METHOD AND SYSTEM FOR SIGNAL PROCESSING REHABILITATION EXERCISE SIGNALS

This application is a National Stage Entry of PCT/JP2019/001160 filed on Jan. 16, 2019, which claims priority from Singapore Patent Application 10201800954Q filed on Feb. 2, 2018, the contents of all of which are incorporated herein by reference, in their entirety.

TECHNICAL FIELD

The present invention relates broadly, but not exclusively, to a method and system for signal processing rehabilitation exercise signals.

BACKGROUND ART

Physical rehabilitation usually involves the treatment of an individual by exercises. Various data are collected during the exercises using sensors attached to the individual and the data collected at different rehabilitation sessions can be analysed to measure the progress of the individual over a period of time.

SUMMARY OF INVENTION

Technical Problem

For example, the movements of a body part can be detected by a motion sensor, such as an angle sensor. The signals from the motion sensor can be used to assess the progress in relation to movements of the body part. However, these signals cannot be used to assess the recovery of a specific muscle.

To assess the recovery of muscles, electromyography can be performed during the exercises. Particularly, electric signals (called electromyogram (EMG)) generated by muscle cells obtained in the electromyography can be analysed in conjunction with the signals from the motion sensor. The EMGs obtained in different rehabilitation sessions can be compared to evaluate the change in the muscle strengths.

The signals collected during rehabilitation exercises are typically processed manually through visual inspection. Manual processing of the signals can be tedious and time-consuming. Reference to prior data or template may also be required to process the signals, which cause delay in the process if no prior data or template is available. Further, the results of the manual processing may not be accurate due to noise signals.

A need therefore exists to provide a method and system for signal processing rehabilitation exercise signals that addresses at least one of the problems above or to provide a useful alternative.

Solution to Problem

According to a first aspect of the present invention, there is provided a method for signal processing rehabilitation exercise signals, the method comprising the steps of:
  receiving a first and a second motion signals associated with movements of a body part, wherein the motion signals comprise temporal data of the movements;
  segmenting each of the first and second motion signals into a plurality of segmented signals based on gradients of the motion signals, wherein each segmented signal has consistent gradient;
  automatically modifying the segmented signals to form multiple combinations of matching signals with similar gradients between the first and second motion signals, such that the first and second motion signals are in one-to-one correspondence; and
  extracting corresponding time intervals of the matching signals in the correspondences.

According to a second aspect of the present invention, there is provided a system for signal processing rehabilitation exercise signals, the system comprising:
  at least one processor; and
  at least one memory module having computer program code stored thereon,
  the computer program code configured to, with the at least one processor, cause the system to:
  receive a first and a second motion signals associated with movements of a body part, wherein the motion signals comprise temporal data of the movements;
  segment each of the first and second motion signals into a plurality of segmented signals based on gradients of the motion signals, wherein each segmented signal has consistent gradient;
  automatically modify the segmented signals to form multiple combinations of matching signals with similar gradients between the first and second motion signals, such that the first and second motion signals are in one-to-one correspondence; and
  extract corresponding time intervals of the matching signals in the correspondences.

BRIEF DESCRIPTION OF DRAWINGS

Embodiments of the invention are provided by way of example only, and will be better understood and readily apparent to one of ordinary skill in the art from the following written description and the drawings, in which.

DESCRIPTION OF EMBODIMENTS

Figure 1:
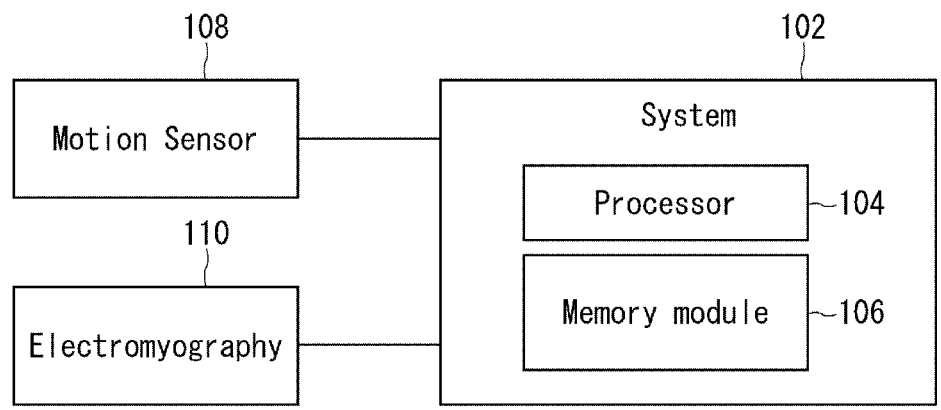
FIG. 1 shows a schematic diagram illustrating a system for signal processing rehabilitation exercise signals in accordance with an example embodiment.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "segmenting", "modifying", "extracting", "identifying", "rectifying", "merging", "calculating", "comparing", "retaining", "removing", "determining", "measuring" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

FIG. 1 shows a schematic diagram illustrating a system 102 for signal processing rehabilitation exercise signals in accordance with an example embodiment. As shown in FIG. 1, the system 102 includes a processor 104 and a memory module 106. The system 102 is communicatively coupled to a motion sensor 108 and an electromyography 110.

The motion sensor 108 is configured to detect movements of a body part. Motion signals are generated based on the detection of the movements. For example, the motion sensor 108 detects a flexion or extension angle of an upper or lower limb during the rehabilitation exercise and the motion signals include the changes of the angle over a period of time.

The electromyography 110 includes electrodes that can be attached to the surface of a muscle or inserted into the muscle of the individual. The electrodes are configured to detect electric potentials generated by the muscles from the movements of the body part. The outputs from the electormyography 110 are electromyogram (EMG) which can be used to track muscle activities. For example, EMGs can be obtained from the muscles to assess muscle recovery, such as muscle strengths. It should be noted that EMGs can be obtained from different muscles at the same time to assess the recovery of a particular body part.

The motion signal and EMGs can be recorded at the same time during the rehabilitation exercise. The analysis of both motion signal and EMG allows a physiotherapist to track the muscle activities associated with some primitive motions, e.g. lifting or lowering of a leg. This assessment may provide a more detailed evaluation of the muscle recovery as compared to an assessment which is based solely on the motion signal or EMGs. Examples of motion signal and EMGs obtained from a rehabilitation exercise are described in further detail below with respect to FIGS. 2A and 2B.

In an embodiment, the motion signals and the EMGs are sent to the system 102 by the motion sensor 108 and electromyography 110 respectively. In order to assess muscle recovery, at least two sets of motion and EMGs are sent to the system 102 for signal processing. These sets of signals are typically recorded a period of time apart (e.g. a week or a month apart) and are associated with the same rehabilitation exercise (e.g. the flexion exercise of a limb).

The first set of signals, which is associated with a first rehabilitation session, includes a first motion signal and a first EMG. The second set of signals, which is associated with a second rehabilitation session, includes a second motion signal and a second EMG. The first rehabilitation session is performed prior to the second rehabilitation session.

The motion signals are first processed to extract the time intervals of primitive motions in the first and second rehabilitation sessions. Initially, the motion signals are segmented into a plurality of segmented signals based on gradients of the motion signals, with each of the segmented signals having consistent gradient. For example, a motion signal is divided into multiple parts and the gradients of each part are calculated. Adjacent parts with similar gradient form a segmented signal. The process of segmenting motion signals in this manner can advantageously identify the segmented signals by using only input motion signals and does not require any additional prior data, such as statistic model. The step of segmenting the motion signals is described in further detail below with respect to FIGS. 3A and 3B.

Normally, the motion signals include interfering noises which are undesirable. The interfering noises in the motion signals may cause difficulties in the comparison of motion signals and, at a subsequent stage, in the comparison of the EMGs. Specifically, due to the interfering noises, the comparison of the first and second motion signals yields one-to-many correspondence at some parts of the signals. In other words, some points in a motion signal have more than one matching point in the corresponding motion signal. As a result, the time intervals of the primitive actions cannot be determined accurately, resulting in inaccurate assessment of the recovery. Thus, the noises in the motion signals need to be removed during the processing of the motion signals in order to provide better results. The motion signals may be processed manually to remove noises. However, manual signal processing is time-consuming.

Accordingly, the segmented signals are automatically modified by the system 102 to form multiple combinations of matching signals with similar gradients and similar time points between the first and second motion signals. In an embodiment of the present invention, one or more combinations of segmented signals are identified between the first and second motion signals. Each combination of the identified segmented signals comprises one or many segmented signal from each of the first and second motion signals and the segmented signals in each combination are similar in terms of gradients and time points. In other words, the segmented signals in each combination represent similar motions performed by the individual, such as the lifting or lowering of a leg by a few degrees, but are recorded in two different sessions, i.e. the first and second rehabilitation sessions respectively.

The step of identifying the combination of matching segmented signals in each of the first and second motion signals with similar gradients and similar time points can be performed using a dynamic time warping (DTW) technique. DTW is a process that measure similarity between two given sequences to find an optimal match. In DTW, the motion signals are warped non-linearly such that the first and second signals are transformed in the time dimension to optimally match each other. As a result, the segmented signals at the first and second motions signals can be identified to form multiple combinations of segmented signals. The DTW technique is described in further detail below with respect to FIG. 4.

There are three types of combinations of segmented signals; 1) one-to-one correspondence which comprises one segmented signal from each first and second motion signals, 2) one-to-many correspondence which comprises one segmented signal from first motion signals and multiple segmented signals from second motion signals, 3) many-to-one correspondence which comprises multiple segmented signals from first motion signals and one segmented signal from second motion signals. The second and third types of combinations of segmented signals, i.e. one-to-many and many-to-one correspondences, are identified as outstanding segmented signals that do not have a matching segmented signals in the corresponding motion signal.

These outstanding segmented signal combinations may include the interfering noise segmented signals which cause the one-to-many or many-to-one correspondence between the first and second motion signals. The interfering noise segmented signals is a segmented signal which does not have a similar gradient with a correspondence of the corresponding motion signal at a similar time point.

DTW may be the main reason of the occurrence of noise segmented signals in the combination. Since the combination of matching segmented signals in each of the first and second motion signals with similar gradients and similar time points are generated in the DTW process, it is possible that some segmented signals, which do not have similar gradients but with similar time point with corresponding segmented signals, are generated in the same combination.

In an example of a one-to-many or many-to-one correspondence, the combination may include one outstanding segmented signal from the first motion signal, A1 and two outstanding segmented signals from the second motion signals, B1 and B2. It is possible that A1, B1 and B2 are recorded in a similar time point but B2 has different gradient as A1 and B1. In this example, B2 may be the segmented signal that is identified as an interfering noise.

The outstanding segmented signal combination is rectified to form the combination of matching signals between the first and second motion signals, thus eliminating any interfering noise.

There are two types of the rectifying step in each way; 1) predetermined threshold base, 2) grouping ID base.

The rectifying step based on a predetermined threshold can be performed in one of three ways, depending on the gradients of the outstanding segmented signals. In a first embodiment, the outstanding segmented signals which belong to the same motion signal (i.e. first or second motion signal) in an outstanding segmented signal combination can be merged to form a merging signal. In a second embodiment, some of the segmented signals in an outstanding segmented signal combination can be removed from the motion signals. In a third embodiment, all the segmented signals in an outstanding segmented signal combination can be removed from the motion signals.

In an embodiment, multiple outstanding segmented signals which belong to the same motion signal (first or second signal) in an outstanding segmented signal combination may be merged if the merged signal has similar gradient as the corresponding segmented signal in a corresponding motion signal. For example, there are two segmented signals that belong to the same motion signal (first motion signal) in an outstanding segmented signal combination which are identified as A1 and B1, respectively, and A2 is a corresponding segmented signal in the second motion signal. The segmented signals A1 and B1 may be merged if the merged signal has similar gradient as A2. For example, the gradient of the merging signal is calculated. The calculated gradient is compared with a gradient of the corresponding segmented signal, A2.

If a difference of the gradients is within a predetermined threshold value (e.g. 0.5 degree/second), the merging signal is retained as a matching signal of the corresponding segmented signal A2. On the other hand, if the difference of the gradients exceeds the predetermined threshold value, A1 and B1 are not merged. This example is described in further detail below with respect to FIGS. 6A-6C.

In another embodiment, if a difference between the gradient of B1 and A2 is exceeds the predetermined threshold value, but the difference between the gradients of A1 and A2 is within a predetermined threshold value, B1 is removed and A1 and A2 are retained as matching signals. If a difference of the gradients between A1 and A2 is exceeds the predetermined threshold value, but the difference between the gradients of B1 and A2 is within a predetermined threshold value, A1 is removed and B1 and A2 are retained as matching signals. Also, if the difference of the gradients between both A1 or B1 and A2 are the same, the segmented signals A1 and B1 are retained as a correspondence of the corresponding segmented signal. This example is described in further detail below with respect to FIGS. 6D and 6E.

A1, B1 and A2 are removed if the difference between the gradients of A1 and A2 exceeds the predetermined threshold value, and the difference between the gradients of B1 and A2 exceeds the predetermined threshold value. More details on this example are explained below with respect to FIG. 7.

Accordingly, each outstanding segmented signal combination is rectified either by merging multiple outstanding segmented signals that belong to the same signal (first or second motion signal) or by removing some of the multiple outstanding segmented signals that belong to the same signal (first or second motion signal) or by removing all of the outstanding segmented signals in the outstanding segmented signal combination. Thus, the interfering noises are advantageously removed.

The rectifying step based on ground identifier (group ID) can be performed in one of three ways, depending on the gradients of the outstanding segmented signals. In a first embodiment, the outstanding segmented signals which belong to the same motion signal (i.e. first or second motion signal) in an outstanding segmented signal combination can be merged to form a merging signal. In a second embodiment, some of the segmented signals in an outstanding segmented signal combination can be removed from the motion signals. In a third embodiment, all the segmented signals in an outstanding segmented signal combination can be removed from the motion signals.

At the beginning, grouping method is applied to all of segmented signals based on the gradient of the segmented signal. The multiple segmented signals which belong to the same group have similar gradient. Calculated group ID is assigned to each segmented signals. The segmented signals, which have similar gradient, are assigned the same group ID. This example is described in further detail below with respect to FIG. 8.

In an embodiment, multiple outstanding segmented signals which belong to the same motion signal (first or second signal) in an outstanding segmented signal combination may be merged if the group ID of the merged signal is the same with the group ID of the corresponding segmented signal in a corresponding motion signal. Here, the gradient of the merging signal is calculated. The group ID of the merged signal is assigned based on the calculated gradient. For example, there are two segmented signals that belong to the same motion signal (first motion signal) in an outstanding segmented signal combination which are identified as A1 and B1, respectively, and A2 is a corresponding segmented signal in the second motion signal. The segmented signals A1 and B1 may be merged if the merged signal has the same group ID as A2.

If the group ID of the merged signal is the same with the group ID of the corresponding segmented signal in a corresponding motion signal A2, the merging signal is retained as a matching signal of the corresponding segmented signal A2. On the other hand, if the group ID is not the same with the group ID with the group ID of the corresponding segmented signal in a corresponding motion signal A2, A1 and B1 are not merged.

In another embodiment, if a group ID of B1 is not the same with a group ID of A2, but a group ID of A1 is the same with a group ID of A2, B1 is removed and A1 and A2 are retained as matching signals. If a group ID of A1 is not the same with a group ID of A2, but a group ID of B1 is the same with a group ID of A2, A1 is removed and B1 and A2 are retained as matching signals.

A1, B1 and A2 are removed if the group ID of A1 is not the same with the group ID of A2 and the group ID of B1 is not the same with the group ID of A2.

Accordingly, each outstanding segmented signal combination is rectified either by merging multiple outstanding segmented signals that belong to the same signal (first or second motion signal) or by removing some of the multiple outstanding segmented signals that belong to the same signal (first or second motion signal) or by removing all of the outstanding segmented signals in the outstanding segmented signal combination. Thus, the interfering noises are advantageously removed.

The process of the rectifying step based on group ID can advantageously perform the rectification step without predefined parameters such as the predetermined threshold value.

Next, the corresponding time intervals of each matching signals between the first and second motion signals are extracted. These time intervals represent the time when a motion is performed in the first and second rehabilitation sessions. The information regarding the time intervals are transferred to the first and second EMGs received from the electromyography 110 to track the muscles activities that occurs within that period of time. In an embodiment, the EMGs are segmented based on the extracted corresponding time intervals. The amplitudes of the segmented EMGs at the corresponding time intervals are compared to determine the change in the strength of the muscle.

It will be appreciated that the motion sensor 108 and electromyography 110 may be configured to communicate with the system 102 through cable or wireless transmissions. The communications may involve direct transmissions between both the motion sensor 108 and electromyography 110 and the system 102. The communications may also be transmitted over the internet. In the latter case, the individual can perform rehabilitation exercises at home and the data collected are transmitted via the internet to a physiotherapist working in the hospital.

Figure 2A:
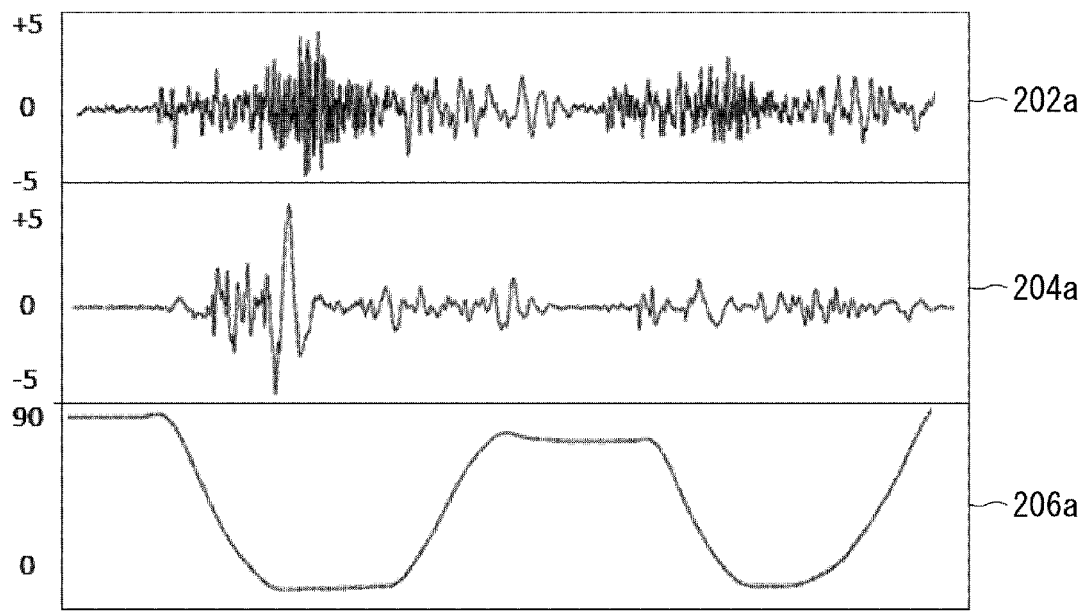
FIG. 2A shows motion signals and EMGs obtained in a first rehabilitation sessions in accordance with an example embodiment.
Figure 2B:
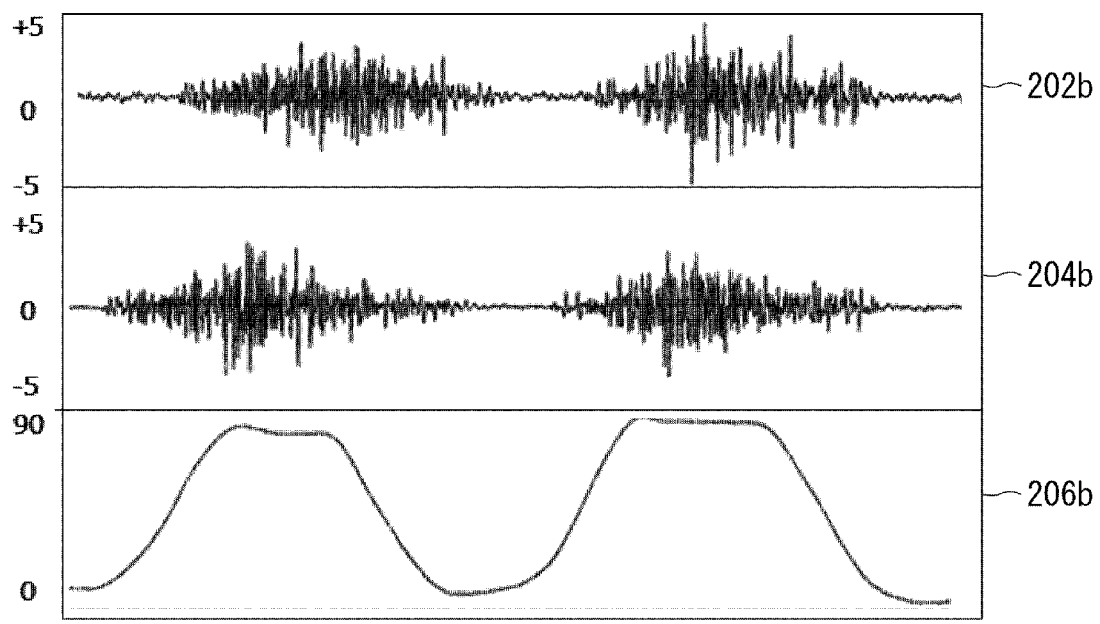
FIG. 2B shows motion signals and EMGs obtained in a second rehabilitation sessions in accordance with an example embodiment.

FIGS. 2A and 2B show motion signals and EMGs obtained in two rehabilitation sessions in accordance with an example embodiment. FIG. 2A shows the results 200a generated in a first rehabilitation session and FIG. 2B shows the results 200b generated in a second rehabilitation session. The results are recorded a period of time apart, e.g. the first rehabilitation session is performed a month before the second rehabilitation session.

FIGS. 2A and 2B show first EMGs 202a, 202b and second EMGs 204a, 204b. These EMGs 202, 204 are obtained by the electromyography 110 attached to four muscles. The figures also show motion signals 206a, 206b obtained by the motion sensor 108. For example, in rehabilitation sessions involving leg extensions, the EMGs 202, 204 may be obtained from the muscles around the thigh area, such as rectus femoris, biceps femoris, vastus medialis and semitendinosus. The motion signals 206 may be the flexion angle at the knee when the individual is seated. The EMGs 202, 204 and motion signals 206 are processed in the system 102 to assess the recovery of these muscles between the two rehabilitation sessions.

Figure 3A:
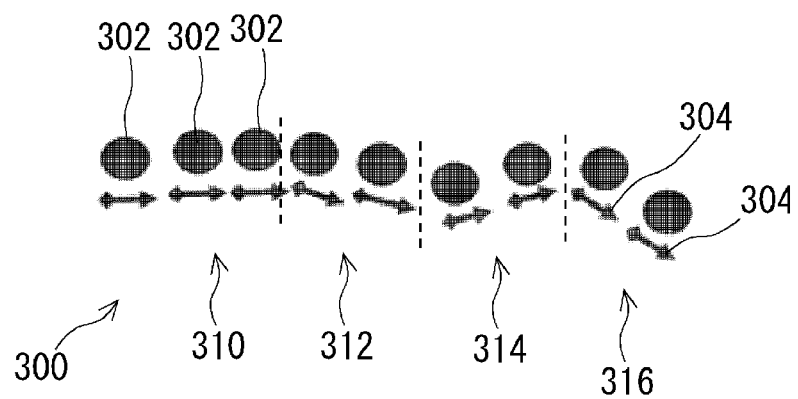
FIG. 3A shows the segmentation of a motion signal in accordance with an example embodiment.
Figure 3B:
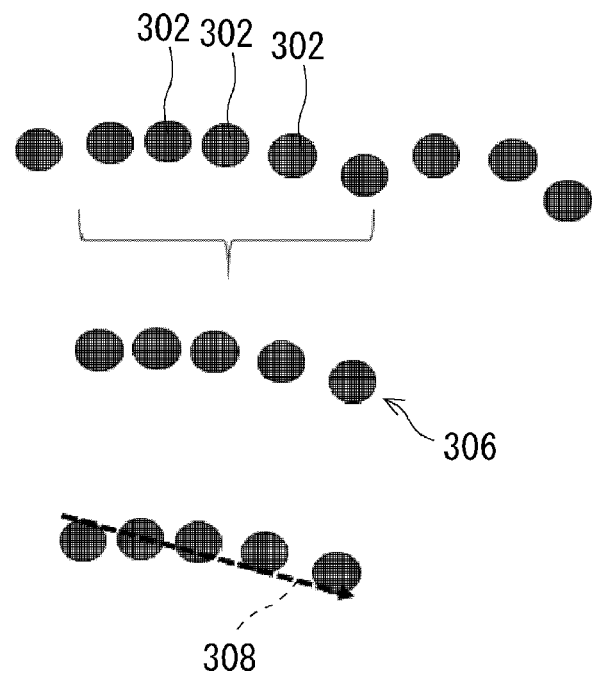
FIG. 3B shows the steps in segmenting the motion signal shown in FIG. 3A.

FIGS. 3A and 3B shows the segmentation of a motion signal 300 in accordance with an example embodiment. Here, the motion signal 300 is divided into multiple smaller parts, represented as a plurality of spheres 302. As shown in FIGS. 3A and 3B, the gradient of each of these smaller parts are calculated for a few smaller parts in front and behind time point around a target part, e.g. two or three in front and behind time point around the target part. The gradients of the smaller parts are shown in FIG. 3A with arrows 304. Upon the calculation of the gradients 304 of the smaller parts, adjacent parts with similar gradient form a cluster or a segmented signal 306 with consistent gradient, shown in FIG. 3B with arrows 308. As a result, the motion signal 300 is segmented into four segmented signals, i.e. a first segmented signal 310, a second segmented signal 312, a third segmented signal 314 and a fourth segmented signal 316.

Figure 4:
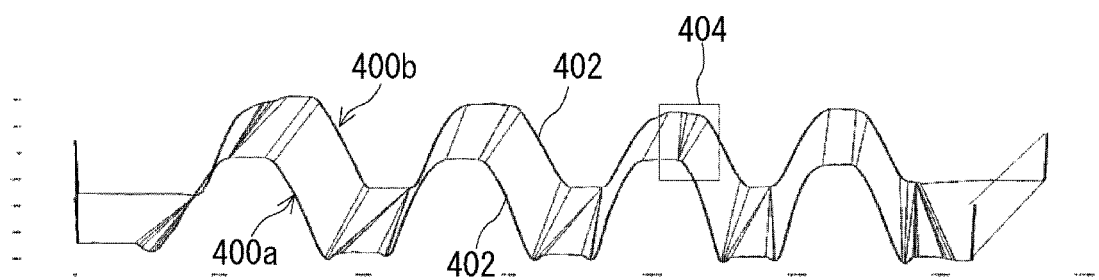
FIG. 4 shows the application of a dynamic time warping (DTW) process to motion signals in accordance with an example embodiment.

FIG. 4 shows the application of a dynamic time warping (DTW) process to a first motion signal 400a and a second motion signal 400b in accordance with an example embodiment. The similarities between the motion signals 400a, 400b are measured to find an optimal match between the two motion signals 400a, 400b. Multiple combinations of segmented signals which have similar gradients are identified in the DTW process. An example of such combination of segmented signal is indicated with reference numeral 402. As shown in FIG. 4, there are some parts of the motion signals 400a, 400b that are in one-to-many correspondence. An example of the one-to-many correspondence is shown in a box 404.

Figure 5A:
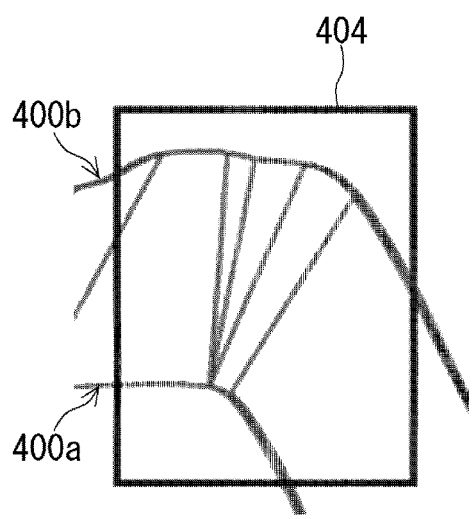
FIG. 5A shows an enlarged view of the box in FIG. 4.
Figure 5B:
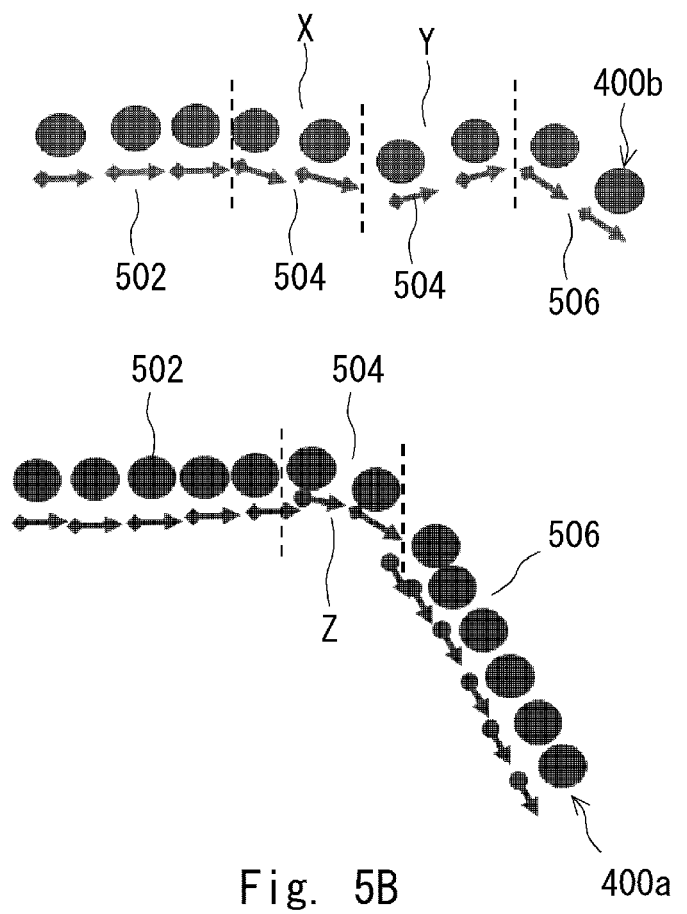
FIG. 5B shows the segmentation of the motion signals shown in FIG. 5A.

FIG. 5A shows an enlarged view of the box 404 in FIG. 4. FIG. 5B shows the segmentation of the motion signals 400a, 400b shown in FIG. 5A. In FIG. 5B, there are three combinations of segmented signals between the motion signals 400a, 400b, i.e. a first combination of segmented signals 502, a second combination of segmented signals 504 and a third combination of segmented signals 506. The second combination of segmented signals includes two outstanding segmented signals X, Y at the second motion signal 400b obtained in the second rehabilitation session, and one outstanding segmented signal Z at the first motion signal 400a obtained in the first rehabilitation session.

Figure 6A:
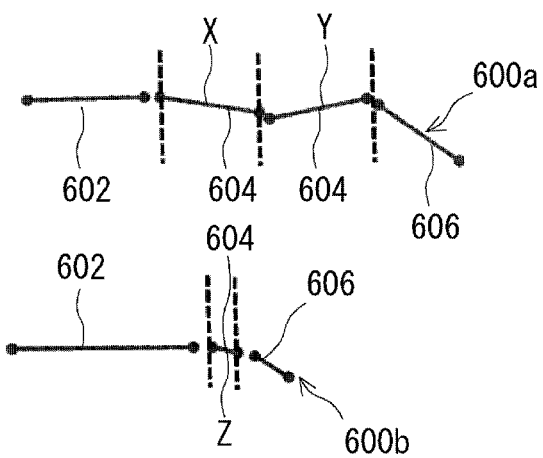
FIG. 6A shows a diagram illustrating combinations of segmented signals between two motion signals in accordance with an example embodiment.

FIGS. 6A-6E show diagrams illustrating the rectification of outstanding segmented signals in accordance with an example embodiment. FIG. 6A shows a diagram illustrating a first motion signal 600a and a second motion signal 600b. There are three combinations of segmented signals between the first and second motion signals 600a, 600b, i.e. a first combination of segmented signals 602, a second combination of segmented signals 604 and a third combination of segmented signals 606. The second combination of segmented signals includes two outstanding segmented signals X, Y at the first motion signal 600a and one outstanding segmented signal Z at the second motion signal 600b.

Figure 6B:
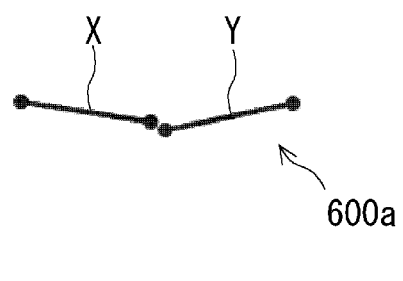
FIG. 6B shows a diagram illustrating the outstanding segmented signals in the second combination of segmented signals shown in FIG. 6A.

FIG. 6B shows a diagram illustrating the outstanding segmented signals X, Y, Z in the second combination of segmented signals 604 shown in FIG. 6A. The outstanding segmented signals X, Y has different gradient as the outstanding segmented signal Z.

Figure 6C:
FIG. 6C shows a diagram illustrating the merging of the outstanding segmented signals shown in FIG. 6A.

FIG. 6C shows a diagram illustrating the merging of the outstanding segmented signals X and Y of FIG. 6A. As shown in FIG. 6C, the outstanding segmented signals X and Y are merged to form a merging signal 608 and a gradient 610 of the merging signal 608 is calculated. The calculated gradient 610 is compared with the gradient of the outstanding segmented signal Z to determine a first gradient difference. If the first gradient difference is within a predetermined threshold value, the merging signal 608 is retained as a matching signal of the corresponding outstanding segmented signal Z.

Figure 6D:
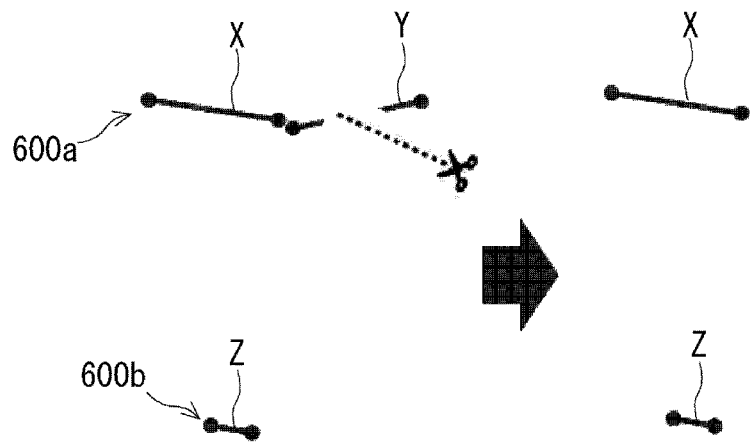
FIG. 6D shows a diagram illustrating the removal of an outstanding segmented signal from the first motion signal shown in FIG. 6A.

FIG. 6D shows a diagram illustrating the removal of the outstanding segmented signal Y from the first motion signal 600a shown in FIG. 6A. In this embodiment, the first gradient difference exceeds the predetermined threshold value. The gradient of the outstanding segmented signal X is compared with the gradient of the outstanding segmented signal Z to determine a second gradient difference. If the second gradient difference is within a predetermined threshold value, the outstanding segmented signal Y is removed from the first motion signal 600a and will not be considered in further analysis of the signals. The outstanding segmented signal X is retained as the correspondence of the corresponding outstanding segmented signal Z.

Figure 6E:
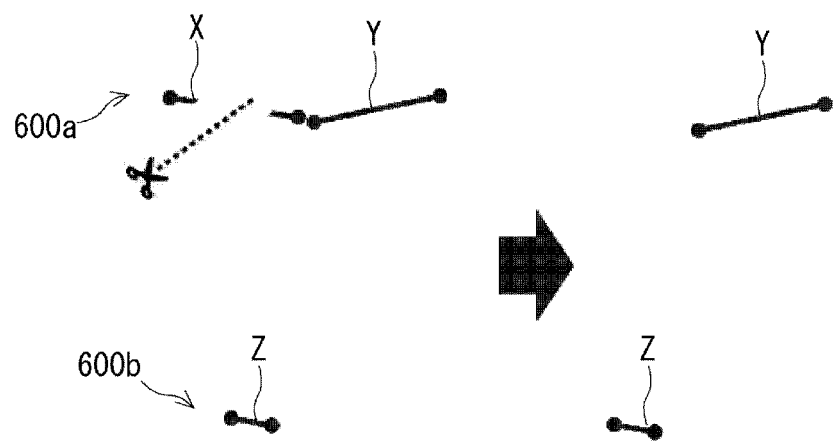
FIG. 6E shows a diagram illustrating the removal of another outstanding segmented signal from the first motion signal shown in FIG. 6A.

FIG. 6E shows a diagram illustrating the removal of the outstanding segmented signal X from the first motion signal 600a shown in FIG. 6A. In this embodiment, the first gradient difference exceeds the predetermined threshold value. The gradient of the outstanding segmented signal Y is compared with the gradient of the outstanding segmented signal Z to determine a second gradient difference. If the second gradient difference is within a predetermined threshold value, the outstanding segmented signal X is removed from the first motion signal 600a and will not be considered in further analysis of the signals. The outstanding segmented signal Y is retained as the correspondence of the corresponding outstanding segmented signal Z. It will be appreciated that, if the gradient difference between the outstanding segmented signals X and Z and the gradient difference between the outstanding segmented signals Y and Z are both within the predetermined threshold value, the outstanding segmented signals (X and Y) are both retained.

Figure 7:
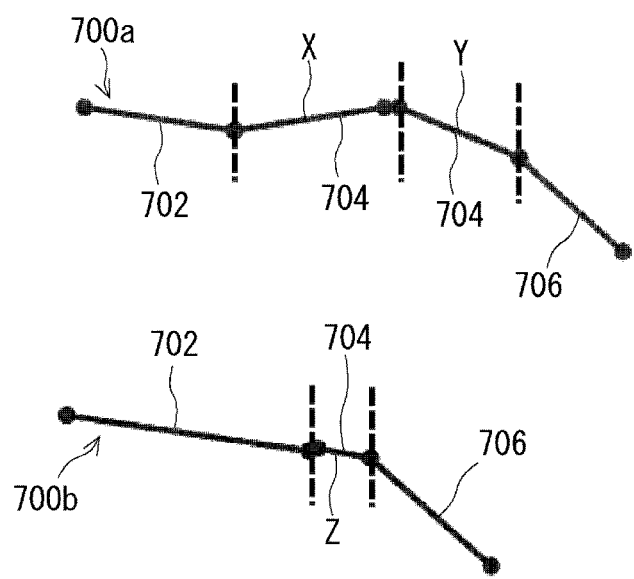
FIG. 7 shows a diagram illustrating combinations of segmented signals between two motion signals in accordance with a further example embodiment.

FIG. 7 shows a diagram illustrating combinations of segmented signals between first and second motion signals in accordance with a further example embodiment. Specifically, FIG. 7 illustrates a first motion signal 700a and a second motion signal 700b. There are three combinations of segmented signals between the first and second motion signals 700a, 700b, i.e. a first combination of segmented signals 702, a second combination of segmented signals 704 and a third combination of segmented signals 706. The second combination of segmented signals includes two outstanding segmented signals X, Y at the first motion signal 700a and one outstanding segmented signal Z at the second motion signal 700b.

In this embodiment, the outstanding segmented signals X, Y are merged and the gradient of the merging signal is compared with the gradient of the outstanding segmented signal Z to determine a first gradient difference. If the first gradient difference exceeds the predetermined threshold value, the gradients of the outstanding segmented signals X, Y are individually compared with the gradient of the outstanding segmented signal Z to determine second gradient differences. If the second gradient differences exceed the predetermined threshold value, all the outstanding segmented signals X, Y, Z are removed from the first and second motion signals 702a, 702b.

Figure 8:
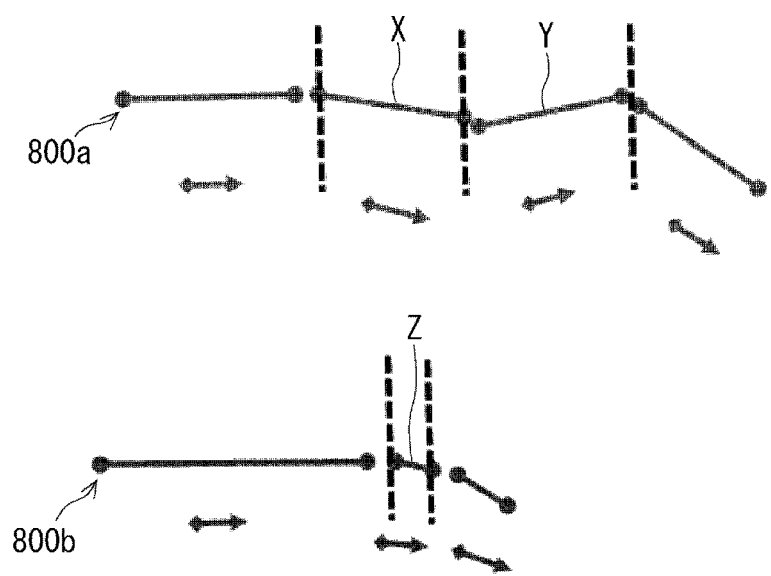
FIG. 8 shows a diagram illustrating combinations of segmented signals between a first motion signal and a second motion signal in accordance with another example embodiment.

FIG. 8 shows a diagram illustrating combinations of segmented signals between a first motion signal 800a and a second motion signal 800b in accordance with another example embodiment. Each of the segmented signals in the first and second motion signals 800a, 800b is assigned a group identifier (group ID) based on the gradients of the segmented signals. For example, four segmented signals in the first motion signal 800a are assigned Group ID 1, Group ID 2, Group ID 3 and Group ID 4 respectively.

As shown in FIG. 8, there are two outstanding segmented signals X, Y at the first motion signal 800a and one outstanding segmented signal Z at the second motion signal 800b. In an embodiment, the outstanding segmented signals X, Y are merged. The gradient of the merging signal is calculated and the merging signal is assigned a group ID based on the calculated gradient. The group IDs of the merging signal and the corresponding outstanding segmented signal Z are compared. If the group identifiers are the same, the merging signal is retained as a correspondence of the corresponding segmented signal.

If the group identifiers are different, the group identifier of the corresponding segmented signal is compared with the group identifiers of the first and second outstanding segmented signal. If the group identifiers of the corresponding segmented signal and the first outstanding segmented signal are the same and if the group identifiers of the corresponding segmented signal and the second outstanding segmented signal are different, the first outstanding segmented signal is retained as a correspondence of the corresponding segmented signal and the second outstanding segmented signal is removed.

On the other hand, if the group identifiers of the corresponding segmented signal and the second outstanding segmented signal are the same and if the group identifiers of the corresponding segmented signal and the first outstanding segmented signal are different, the second outstanding segmented signal is retained as a correspondence of the corresponding segmented signal and the first outstanding segmented signal is removed.

It will be appreciated that, if the group identifiers of the corresponding segmented signal, the first outstanding segmented signal and the second outstanding segmented signal are all the same, the first and second outstanding segmented signals are merged and the merged segmented signal is retained as a correspondence of the corresponding segmented signal.

Further, if the group identifiers of the corresponding segmented signal and the first and second outstanding segmented signals are all different, all the first and second outstanding segmented signals and the corresponding segmented signal are removed from the motion signals 802a, 802b.

Upon the rectification of the outstanding segmented signals, the first and second motion signals described in FIGS. 6A-6E, 7 and 8 are in one-to-one correspondence. The corresponding time intervals of each pair of matching signals are extracted and transferred to the respective EMGs.

Figure 9A:
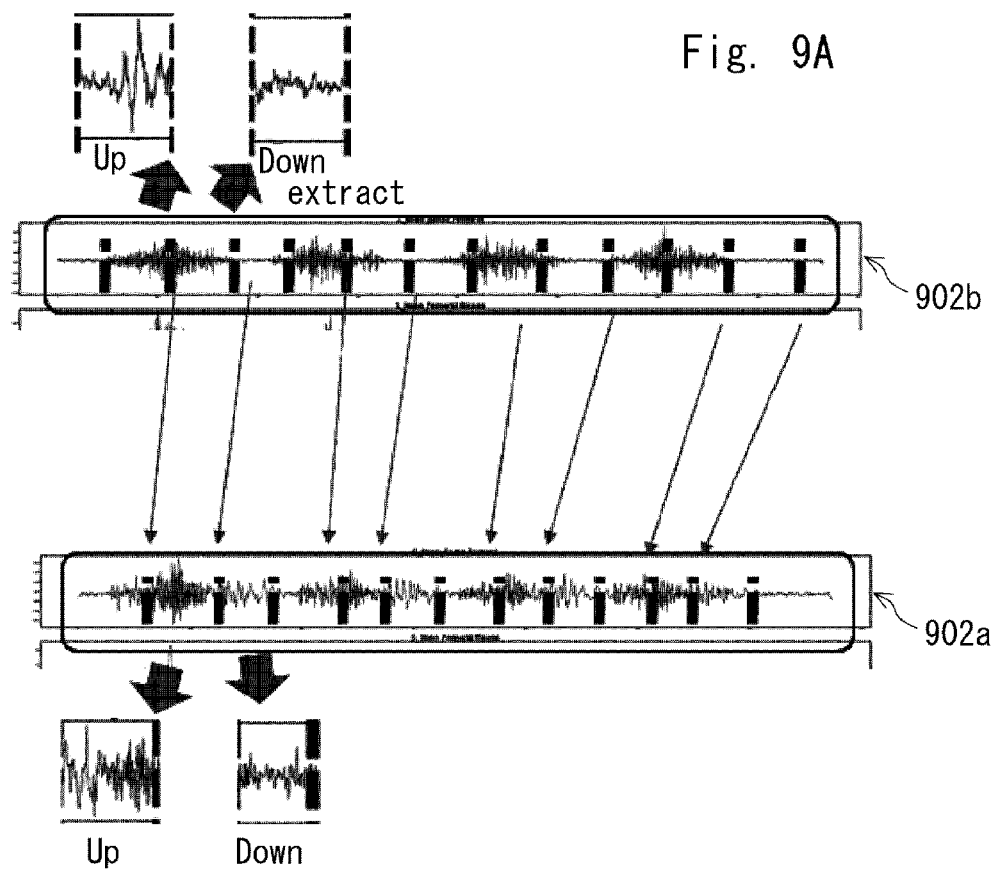
FIG. 9A shows the segmentation of a first EMG and a second EMG based on the extracted corresponding time intervals in accordance with an example embodiment.

FIG. 9A shows the segmentation of a first EMG 902a and a second EMG 902b based on the extracted corresponding time intervals in accordance with an example embodiment. The first EMG 902a is obtained from a first rehabilitation session and the second EMG 902b is obtained from a second rehabilitation session. In this example, the EMGs are segmented to compare the EMGs obtained from leg exercises.

Figure 9B:
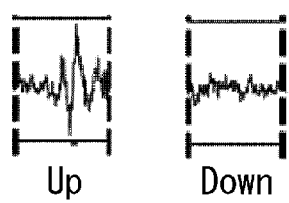
FIG. 9B shows the comparison of the segmented EMGs in FIG. 9A.
Figure 9B:
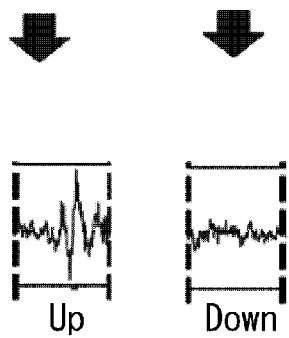

FIG. 9B shows the comparison of the segmented EMGs obtained from the first and second rehabilitation sessions. As shown in FIG. 9B, the EMGs for the same motions are compared to determine a difference in the amplitudes of the EMGs in the corresponding time intervals.

Figure 9C:
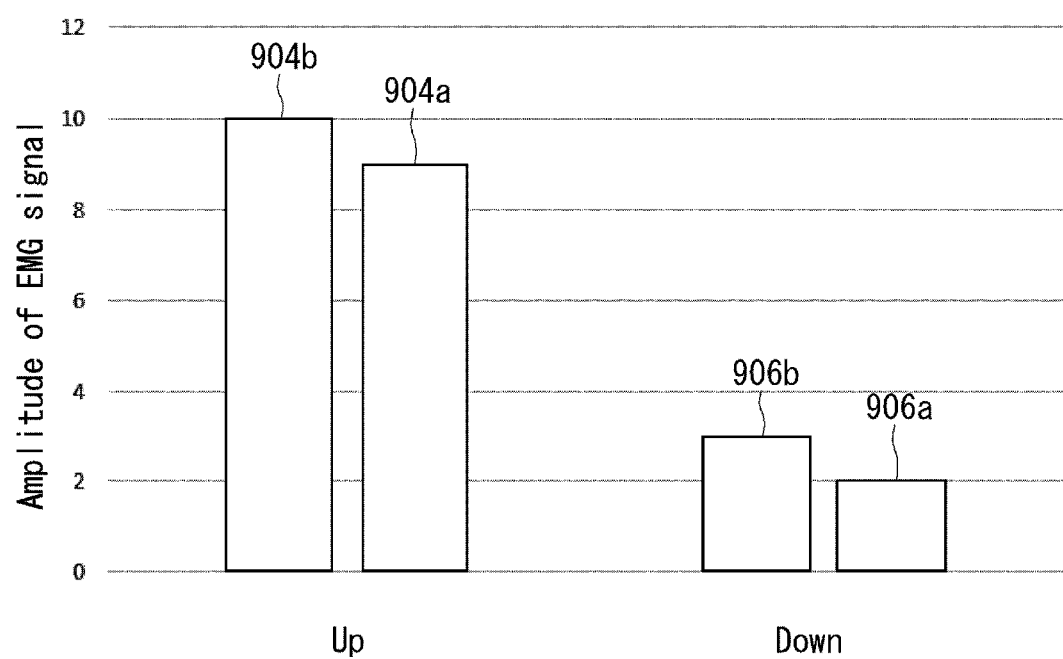
FIG. 9C shows a bar graph illustrating the amplitudes of the segmented EMGs in FIG. 9A.

FIG. 9C shows a bar graph illustrating the amplitudes of the EMGs for the performance of two primitive motions in the first and second rehabilitation sessions. Specifically, the amplitudes of the EMGs for lifting the leg in both sessions are represented as a first bar 904a and a second bar 904b respectively. The amplitudes of the EMGs for lowering the leg in both sessions are represented as a third bar 906a and a fourth bar 906b respectively. As shown in FIG. 9C, the second bar 904b is higher than the first bar 904a, and the third bar 906a is higher than the fourth bar 906b. In other words, the amplitudes of the EMGs obtained in the second rehabilitation session are higher than that of the first rehabilitation session. This shows that the strength of the muscle has improved.

Figure 10:
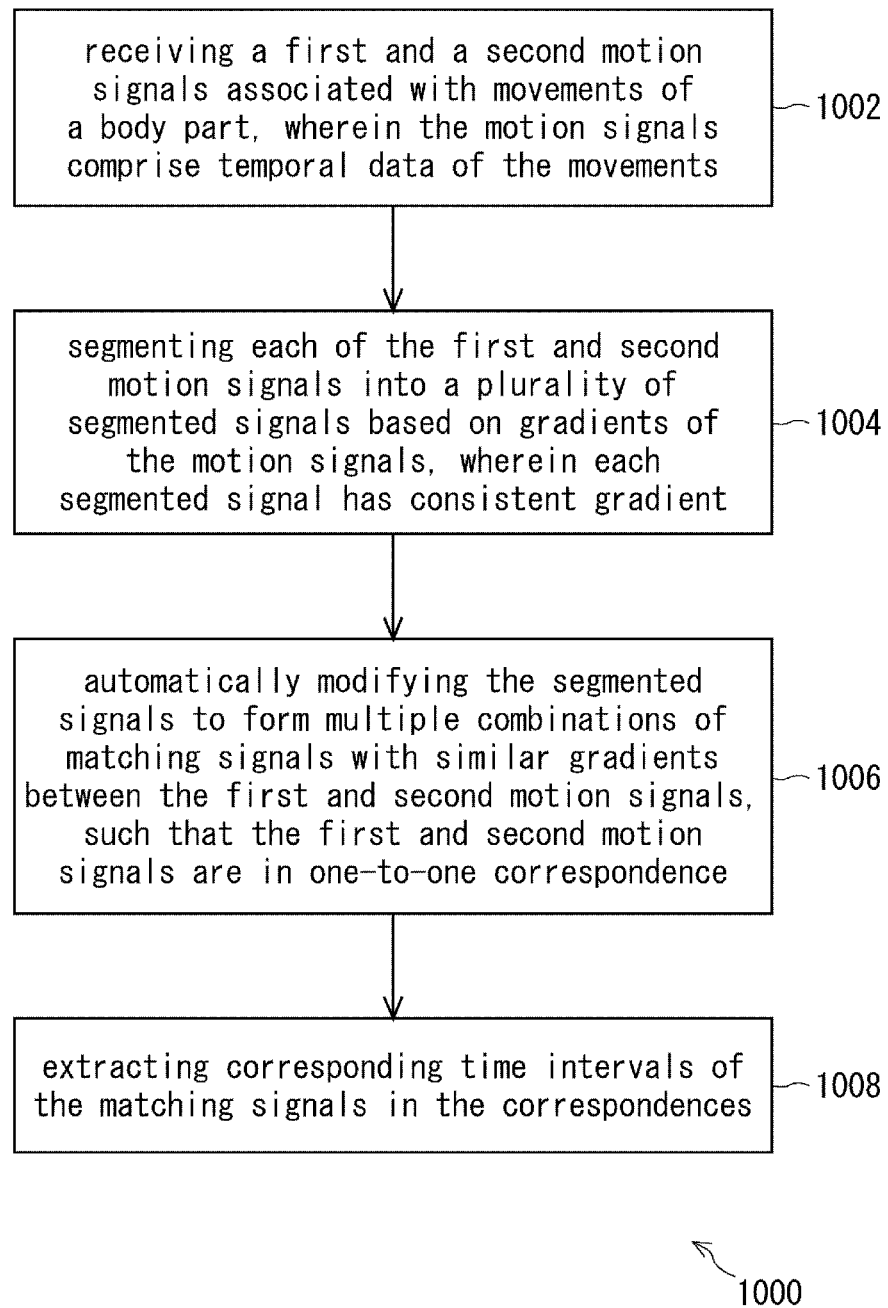
FIG. 10 shows a flow chart illustrating a method for signal processing rehabilitation exercise signals in accordance with an example embodiment.

FIG. 10 shows a flow chart 1000 illustrating a method for signal processing rehabilitation exercise signals in accordance with an example embodiment. At step 1002, a first and a second motion signals associated with movements of a body part are received, wherein the motion signals comprise temporal data of the movements. At step 1004, each of the first and second motion signals is segmented into a plurality of segmented signals based on gradients of the motion signals, wherein each segmented signal has consistent gradient. At step 1006, the segmented signals are automatically modified to form multiple combinations of matching signals with similar gradients between the first and second motion signals, such that the first and second motion signals are in one-to-one correspondence. At step 1008, corresponding time intervals of the matching signals in the correspondences are extracted.

Figure 11:
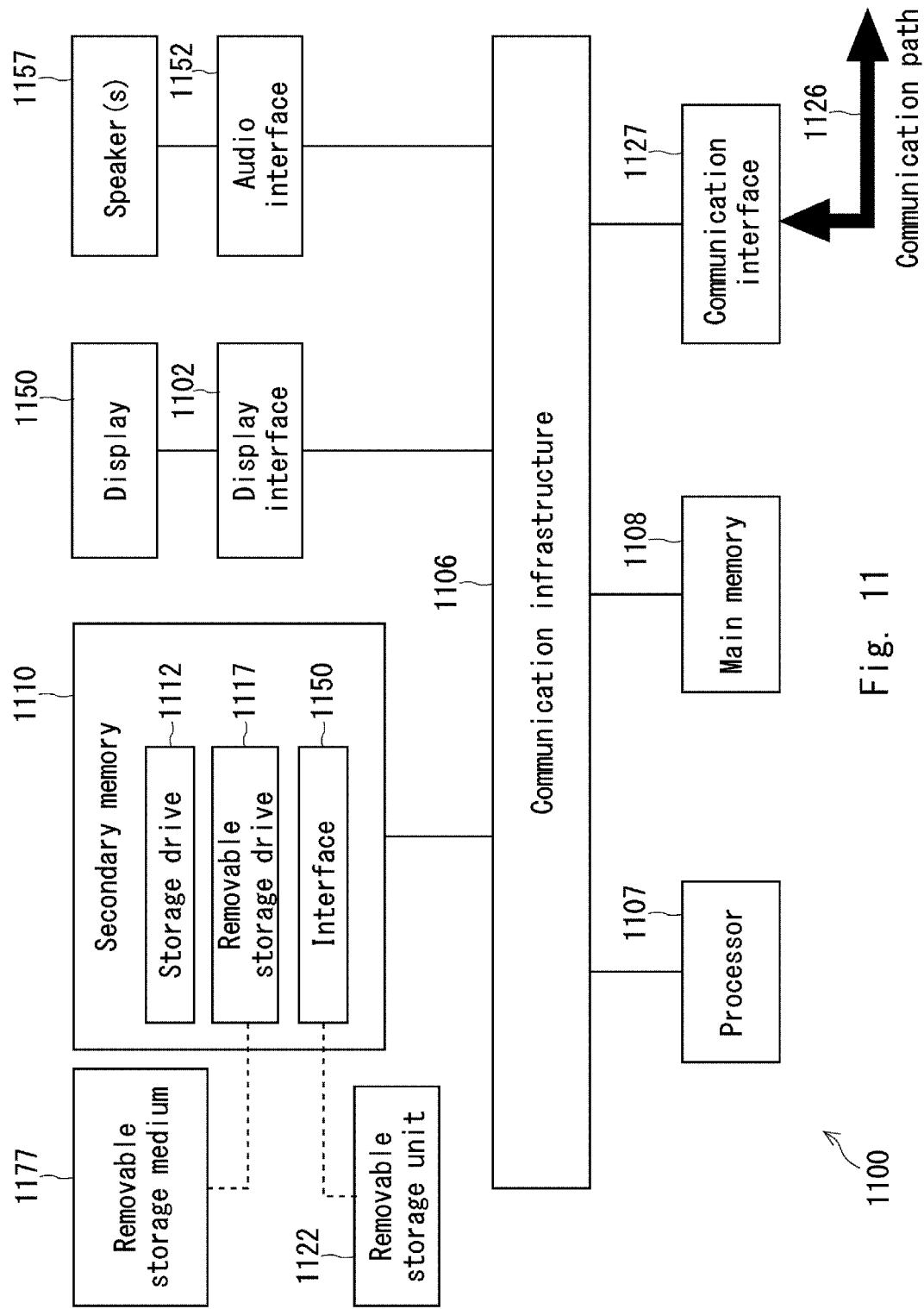
FIG. 11 shows a schematic diagram illustrating a computer suitable for implementing the system and method of the example embodiments.

FIG. 11 depicts an exemplary computing device 1100, hereinafter interchangeably referred to as a computer system 1100, where one or more such computing devices 1100 may be used for signal processing. The exemplary computing device 1100 can be used to implement the system 102 shown in FIG. 1 and the method shown in FIG. 10. The following description of the computing device 1100 is provided by way of example only and is not intended to be limiting.

As shown in FIG. 11, the example computing device 1100 includes a processor 1107 for executing software routines. Although a single processor is shown for the sake of clarity, the computing device 1100 may also include a multi-processor system. The processor 1107 is connected to a communication infrastructure 1106 for communication with other components of the computing device 1100. The communication infrastructure 1106 may include, for example, a communications bus, cross-bar, or network.

The computing device 1100 further includes a main memory 1108, such as a random access memory (RAM), and a secondary memory 1110. The secondary memory 1110 may include, for example, a storage drive 1112, which may be a hard disk drive, a solid state drive or a hybrid drive, and/or a removable storage drive 1117, which may include a magnetic tape drive, an optical disk drive, a solid state storage drive (such as a USB flash drive, a flash memory device, a solid state drive or a memory card), or the like. The removable storage drive 1117 reads from and/or writes to a removable storage medium 1177 in a well-known manner. The removable storage medium 1177 may include magnetic tape, optical disk, non-volatile memory storage medium, or the like, which is read by and written to by removable storage drive 1117. As will be appreciated by persons skilled in the relevant art(s), the removable storage medium 1177 includes a computer readable storage medium having stored therein computer executable program code instructions and/or data.

In an alternative implementation, the secondary memory 1110 may additionally or alternatively include other similar means for allowing computer programs or other instructions to be loaded into the computing device 1100. Such means can include, for example, a removable storage unit 1122 and an interface 1150. Examples of a removable storage unit 1122 and interface 1150 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1122 and interfaces 1150 which allow software and data to be transferred from the removable storage unit 1122 to the computer system 1100.

The computing device 1100 also includes at least one communication interface 1127. The communication interface 1127 allows software and data to be transferred between computing device 1100 and external devices via a communication path 1126. In various embodiments of the inventions, the communication interface 1127 permits data to be transferred between the computing device 1100 and a data communication network, such as a public data or private data communication network. The communication interface 1127 may be used to exchange data between different computing devices 1100 which such computing devices 1100 form part an interconnected computer network. Examples of a communication interface 1127 can include a modem, a network interface (such as an Ethernet card), a communication port (such as a serial, parallel, printer, GPIB, IEEE 1394, RJ45, USB), an antenna with associated circuitry and the like. The communication interface 1127 may be wired or may be wireless. Software and data transferred via the communication interface 1127 are in the form of signals which can be electronic, electromagnetic, optical or other signals capable of being received by communication interface 1127. These signals are provided to the communication interface via the communication path 1126.

As shown in FIG. 11, the computing device 1100 further includes a display interface 1102 which performs operations for rendering images to an associated display 1150 and an audio interface 1152 for performing operations for playing audio content via associated speaker(s) 1157.

As used herein, the term "computer program product" may refer, in part, to removable storage medium 1177, removable storage unit 1122, a hard disk installed in storage drive 1112, or a carrier wave carrying software over communication path 1126 (wireless link or cable) to communication interface 1127. Computer readable storage media refers to any non-transitory, non-volatile tangible storage medium that provides recorded instructions and/or data to the computing device 1100 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1100. Examples of transitory or non-tangible computer readable transmission media that may also participate in the provision of software, application programs, instructions and/or data to the computing device 1100 include radio or infra-red transmission channels as well as a network connection to another computer or networked device, and the Internet or Intranets including e-mail transmissions and information recorded on Websites and the like.

The computer programs (also called computer program code) are stored in main memory 1108 and/or secondary memory 1110. Computer programs can also be received via the communication interface 1127. Such computer programs, when executed, enable the computing device 1100 to perform one or more features of embodiments discussed herein. In various embodiments, the computer programs, when executed, enable the processor 1107 to perform features of the above-described embodiments. Accordingly, such computer programs represent controllers of the computer system 1100.

Software may be stored in a computer program product and loaded into the computing device 1100 using the removable storage drive 1117, the storage drive 1112, or the interface 1150. The computer program product may be a non-transitory computer readable medium. Alternatively, the computer program product may be downloaded to the computer system 1100 over the communications path 1126. The software, when executed by the processor 1107, causes the computing device 1100 to perform functions of embodiments described herein.

It is to be understood that the embodiment of FIG. 11 is presented merely by way of example. Therefore, in some embodiments one or more features of the computing device 1100 may be omitted. Also, in some embodiments, one or more features of the computing device 1100 may be combined together. Additionally, in some embodiments, one or more features of the computing device 1100 may be split into one or more component parts.

When the computing device 1100 is configured to perform signal processing, the computing system 1100 will have a non-transitory computer readable medium having stored thereon an application which when executed causes the computing system 1100 to perform steps comprising: receiving a first and a second motion signals associated with movements of a body part, wherein the motion signals comprise temporal data of the movements; segmenting each of the first and second motion signals into a plurality of segmented signals based on gradients of the motion signals, wherein each segmented signal has consistent gradient; automatically modifying the segmented signals to form multiple combinations of matching signals with similar gradients between the first and second motion signals, such that the first and second motion signals are in one-to-one correspondence; and extracting corresponding time intervals of the matching signals in the correspondences.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, the whole or part of the exemplary embodiments disclosed above can be described as, but not limited to, the following supplementary notes.

Supplementary Note 1

A method for signal processing rehabilitation exercise signals, the method comprising the steps of:

receiving a first and a second motion signals associated with movements of a body part, wherein the motion signals comprise temporal data of the movements;

segmenting each of the first and second motion signals into a plurality of segmented signals based on gradients of the motion signals, wherein each segmented signal has consistent gradient;

automatically modifying the segmented signals to form multiple combinations of matching signals with similar gradients between the first and second motion signals, such that the first and second motion signals are in one-to-one correspondence; and extracting corresponding time intervals of the matching signals in the correspondences.

Supplementary Note 2

The method as claimed in note 1, wherein automatically modifying the segmented signals comprises the steps of:
identifying one or more combinations of segmented signals between the first and second motion signals, wherein each combination of segmented signals comprises segmented signals with similar gradients;
identifying one or more combinations of outstanding segmented signals which are outstanding from the step of identifying the one or more combinations of segmented signals with similar gradients; and
rectifying the outstanding segmented signals in each of the first and second motion signals to form the matching signals.

Supplementary Note 3

The method as claimed in note 2, wherein rectifying the combination of outstanding segmented signals comprises the steps of:
merging a first outstanding segmented signal to a second outstanding segmented signal adjoined to the first outstanding segmented signal to form a merging signal, wherein the first and second outstanding segmented signals comprise, at the corresponding motion signal, a corresponding segmented signal;
calculating a gradient of the merging signal;
comparing the calculated gradient of the merging signal and a gradient of the corresponding segmented signal to determine a first gradient difference; and
if the first gradient difference is within a predetermined threshold value, retaining the merging signal as a correspondence of the corresponding segmented signal.

Supplementary Note 4

The method as claimed in note 3, further comprising the steps of:
if the first gradient difference exceeds the predetermined threshold value, comparing the gradients of the corresponding segmented signal and the first outstanding segmented signal to determine a second gradient difference;
comparing the gradients of the corresponding segmented signal and the second outstanding segmented signal to determine a third gradient difference;
if the second gradient difference is within a predetermined threshold value and the third gradient difference exceeds the predetermined threshold value, retaining the first outstanding segmented signal as a correspondence of the corresponding segmented signal and removing the second outstanding segmented signal;
if the second gradient difference exceeds the predetermined threshold and the third gradient difference value is within a predetermined threshold value, retaining the second outstanding segmented signal as a correspondence of the corresponding segmented signal and removing the first outstanding segmented signal;
if the second gradient difference and the third gradient difference are within a predetermined threshold value and the second gradient difference is smaller than the third gradient difference, retaining the first outstanding segmented signal as a correspondence of the corresponding segmented signal and removing the second outstanding segmented signal; and
if the second gradient difference and the third gradient difference are within a predetermined threshold value, merging the first outstanding segmented signal and the second outstanding segmented signal and retaining the merged signal as a correspondence of the corresponding segmented signal.

Supplementary Note 5

The method as claimed in note 4, further comprising the steps of:
if the second and third gradient difference exceed a predetermined threshold value, removing the first and second outstanding segmented signals and the corresponding segmented signal.

Supplementary Note 6

The method as claimed in note 2, further comprising the step of assigning a group identifier to the segmented signals based on the gradients of the segmented signals.

Supplementary Note 7

The method as claimed in note 6, wherein rectifying the combination of outstanding segmented signals comprises the steps of:
merging a first outstanding segmented signal to a second outstanding segmented signal adjoined to the first outstanding segmented signal to form a merging signal, wherein the first and second outstanding segmented signals comprise, at the corresponding motion signal, a corresponding segmented signal;
calculating a gradient of the merging signal;
assigning a group identifier to the merging signal based on the gradient of the merging signal;
comparing the group identifiers of the merging signal and the corresponding segmented signal; and
if the group identifiers are the same, retaining the merging signal as a correspondence of the corresponding segmented signal.

Supplementary Note 8

The method as claimed in note 7, further comprising the steps of:
if the group identifiers are different, comparing the group identifiers of the corresponding segmented signal and the first outstanding segmented signal;
comparing the group identifiers of the corresponding segmented signal and the second outstanding segmented signal;

if the group identifiers of the corresponding segmented signal and the first outstanding segmented signal are the same and if the group identifiers of the corresponding segmented signal and the second outstanding segmented signal are different, retaining the first outstanding segmented signal as a correspondence of the corresponding segmented signal and removing the second outstanding segmented signal;

if the group identifiers of the corresponding segmented signal and the second outstanding segmented signal are the same and if the group identifiers of the corresponding segmented signal and the first outstanding segmented signal are different, retaining the second outstanding segmented signal as a correspondence of the corresponding segmented signal and removing the first outstanding segmented signal; and if the group identifiers of the corresponding segmented signal, the first outstanding segmented signal and the second outstanding segmented signal are the same, merging the first and second outstanding segmented signals and retaining the merged signal as a correspondence of the corresponding segmented signal.

Supplementary Note 9

The method as claimed in note 8, further comprising the steps of:
if the group identifiers of the corresponding segmented signal and the first and second outstanding segmented signals are different, removing the first and second outstanding segmented signals and the corresponding segmented signal.

Supplementary Note 10

The method as claimed in any one of the preceding notes, further comprising the steps of:
receiving a first and second electromyograms (EMGs) associated with the first and second motion signals respectively, the EMGs include records of electric potential generated by a muscle and are recorded at a same time as the respective motion signals; and
comparing the first and second EMGs according to the extracted corresponding time intervals to determine a change in the strength of the muscle.

Supplementary Note 11

The method as claimed in note 10, wherein comparing the first and second EMGs comprises the steps of:
segmenting the EMGs based on the extracted corresponding time intervals; and
determining a difference in amplitudes of the segmented EMGs between the first and second EMGs.

Supplementary Note 12

The method as claimed in any one of the preceding notes, wherein the motion signals comprise flexion or extension angle of an upper or lower limb over a period of time.

Supplementary Note 13

The method as claimed in note 2, wherein identifying one or more combinations of segmented signals with similar gradients between the first and second motion signals comprises measuring similarity between the segmented signals of the first and second motion signals using a dynamic time warping (DTW) technique.

Supplementary Note 14

A system for signal processing rehabilitation exercise signals, the system comprising:
at least one processor; and
at least one memory module having computer program code stored thereon, the computer program code configured to, with the at least one processor, cause the system to:
receive a first and a second motion signals associated with movements of a body part, wherein the motion signals comprise temporal data of the movements;
segment each of the first and second motion signals into a plurality of segmented signals based on gradients of the motion signals, wherein each segmented signal has consistent gradient;
automatically modify the segmented signals to form multiple combinations of matching signals with similar gradients between the first and second motion signals, such that the first and second motion signals are in one-to-one correspondence; and
extract corresponding time intervals of the matching signals in the correspondences.

This application is based upon and claims the benefit of priority from Singapore Patent Application No. 10201800954Q, filed on Feb. 2, 2018, the disclosure of which is incorporated herein in its entirety by reference.

REFERENCE SIGNS LIST

102 system
104 processor
106 memory module
108 motion sensor
202*a*, 202*b* first EMGs
204*a*, 204*b* second EMGs
206 motion signal
300 motion signal
400*a* first motion signal
400*b* second motion signal
404 box
502 segmented signal
504 segmented signal
506 segmented signal
600*a* first motion signal
600*b* second motion signal
608 merging signal
610 gradient
700*a* first motion signal
700*b* second motion signal
800*a* first motion signal
800*b* second motion signal

What is claimed is:
1. A method for signal processing rehabilitation exercise signals, the method performed by a computer and comprising:
receiving first and second motion signals associated with movements of a body part as to muscle movement, wherein the first and second motion signals comprise temporal data of the movements;
segmenting each of the first and second motion signals into a plurality of segmented signals based on gradients of the first and second motion signals, wherein each segmented signal has a consistent gradient;

automatically modifying the segmented signals to form multiple combinations of matching signals with similar gradients between the first and second motion signals, such that the first and second motion signals are in one-to-one correspondence;

extracting corresponding time intervals of the matching signals in the correspondences;

recording first and second electromyograms (EMGs) respectively associated with the first and second motion signals, the first and second EMGs including records of electric potential generated by a muscle and are recorded at a same time as the first and second motion signals; and comparing the first and second EMGs according to the extracted corresponding time intervals to determine a change in a strength of the muscle in order to correlate the first and second EMG signals with the first and second motion signals as to muscle movement, by:
  segmenting the first and second EMGs based on the extracted corresponding time intervals; and
  determining a difference in amplitudes of the segmented first and second EMGs between the first and second EMGs, wherein the first and second motion signals comprise flexion or extension angle of an upper or lower limb over a period of time.

2. The method as claimed in claim 1, wherein automatically modifying the segmented signals comprises:
  identifying one or more combinations of segmented signals between the first and second motion signals, wherein each combination of segmented signals comprises segmented signals with similar gradients;
  identifying one or more combinations of outstanding segmented signals which are outstanding from identifying the one or more combinations of segmented signals with similar gradients; and
  rectifying the outstanding segmented signals in each of the first and second motion signals to form the matching signals.

3. The method as claimed in claim 2, wherein rectifying the combination of outstanding segmented signals comprises:
  merging a first outstanding segmented signal to a second outstanding segmented signal adjoined to the first outstanding segmented signal to form a merging signal, wherein the first and second outstanding segmented signals comprise, at the corresponding motion signal, a corresponding segmented signal;
  calculating a gradient of the merging signal;
  comparing the calculated gradient of the merging signal and a gradient of the corresponding segmented signal to determine a first gradient difference; and
  in a case where the first gradient difference is within a predetermined threshold value, retaining the merging signal as a correspondence of the corresponding segmented signal.

4. The method as claimed in claim 3, further comprising:
  in a case where the first gradient difference exceeds the predetermined threshold value, comparing the gradients of the corresponding segmented signal and the first outstanding segmented signal to determine a second gradient difference;
  comparing the gradients of the corresponding segmented signal and the second outstanding segmented signal to determine a third gradient difference;

in a case where the second gradient difference is within a predetermined threshold value and the third gradient difference exceeds the predetermined threshold value, retaining the first outstanding segmented signal as a correspondence of the corresponding segmented signal and removing the second outstanding segmented signal;

in a case where the second gradient difference exceeds the predetermined threshold and the third gradient difference value is within a predetermined threshold value, retaining the second outstanding segmented signal as a correspondence of the corresponding segmented signal and removing the first outstanding segmented signal;

in a case where the second gradient difference and the third gradient difference are within a predetermined threshold value and the second gradient difference is smaller than the third gradient difference, retaining the first outstanding segmented signal as a correspondence of the corresponding segmented signal and removing the second outstanding segmented signal; and in a case where the second gradient difference and the third gradient difference are within a predetermined threshold value, merging the first outstanding segmented signal and the second outstanding segmented signal and retaining the merged signal as a correspondence of the corresponding segmented signal.

5. The method as claimed in claim 4, further comprising:
  in a case where the second and third gradient difference exceed a predetermined threshold value, removing the first and second outstanding segmented signals and the corresponding segmented signal.

6. The method as claimed in claim 2, further comprising assigning a group identifier to the segmented signals based on the gradients of the segmented signals.

7. The method as claimed in claim 6, wherein rectifying the combination of outstanding segmented signals comprises:
  merging a first outstanding segmented signal to a second outstanding segmented signal adjoined to the first outstanding segmented signal to form a merging signal, wherein the first and second outstanding segmented signals comprise, at the corresponding motion signal, a corresponding segmented signal;
  calculating a gradient of the merging signal;
  assigning a group identifier to the merging signal based on the gradient of the merging signal;
  comparing the group identifiers of the merging signal and the corresponding segmented signal; and
  in a case where the group identifiers are the same, retaining the merging signal as a correspondence of the corresponding segmented signal.

8. The method as claimed in claim 7, further comprising:
  in a case where the group identifiers are different, comparing the group identifiers of the corresponding segmented signal and the first outstanding segmented signal;
  comparing the group identifiers of the corresponding segmented signal and the second outstanding segmented signal;
  in a case where the group identifiers of the corresponding segmented signal and the first outstanding segmented signal are the same and in a case where the group identifiers of the corresponding segmented signal and the second outstanding segmented signal are different, retaining the first outstanding segmented signal as a correspondence of the corresponding segmented signal and removing the second outstanding segmented signal;

in a case where the group identifiers of the corresponding segmented signal and the second outstanding segmented signal are the same and in a case where the group identifiers of the corresponding segmented signal and the first outstanding segmented signal are different, retaining the second outstanding segmented signal as a correspondence of the corresponding segmented signal and removing the first outstanding segmented signal; and in a case where the group identifiers of the corresponding segmented signal, the first outstanding segmented signal and the second outstanding segmented signal are the same, merging the first and second outstanding segmented signals and retaining the merged signal as a correspondence of the corresponding segmented signal.

9. The method as claimed in claim 8, further comprising:
in a case where the group identifiers of the corresponding segmented signal and the first and second outstanding segmented signals are different, removing the first and second outstanding segmented signals and the corresponding segmented signal.

10. The method as claimed in claim 2, wherein identifying one or more combinations of segmented signals with similar gradients between the first and second motion signals comprises measuring similarity between the segmented signals of the first and second motion signals using a dynamic time warping (DTW) technique.

11. A system for signal processing rehabilitation exercise signals, the system comprising:
at least one memory storing computer program code; and
at least one processor configured to execute the computer program code to perform processing comprising:
receiving first and second motion signals associated with movements of a body part as to muscle movement, wherein the first and second motion signals comprise temporal data of the movements;
segmenting each of the first and second motion signals into a plurality of segmented signals based on gradients of the first and second motion signals, wherein each segmented signal has a consistent gradient;
automatically modifying the segmented signals to form multiple combinations of matching signals with similar gradients between the first and second motion signals, such that the first and second motion signals are in one-to-one correspondence;
extracting corresponding time intervals of the matching signals in the correspondences;
recording first and second electromyograms (EMGs) respectively associated with the first and second motion signals, the first and second EMGs including records of electric potential generated by a muscle and are recorded at a same time as the first and second motion signals; and
comparing the first and second EMGs according to the extracted corresponding time intervals to determine a change in a strength of the muscle in order to correlate the first and second EMG signals with the first and second motion signals as to muscle movement, by:
segmenting the first and second EMGs based on the extracted corresponding time intervals; and
determining a difference in amplitudes of the segmented first and second EMGs between the first and second EMGs,
wherein the first and second motion signals comprise flexion or extension angle of an upper or lower limb over a period of time.

* * * * *